United States Patent [19]

Hacker et al.

[11] Patent Number: 4,883,307
[45] Date of Patent: Nov. 28, 1989

[54] REAR QUARTER PANEL FORMING INTEGRAL CAB EXTENDER

[75] Inventors: Jay P. Hacker, Fort Wayne, Ind.; Rodney A. Laukhuf, Haviland, Ohio

[73] Assignee: Navistar International Transportation Corp., Chicago, Ill.

[21] Appl. No.: 204,822

[22] Filed: Jun. 10, 1988

[51] Int. Cl.⁴ .............................................. B62D 35/00
[52] U.S. Cl. .................................................. 296/180.2
[58] Field of Search .............................. 296/180.2, 91; 29/526.1

[56] References Cited

U.S. PATENT DOCUMENTS

| | | | |
|---|---|---|---|
| D. 271,864 | 12/1983 | Kangas | D12/96 |
| D. 282,920 | 3/1986 | Eggan | D12/96 |
| D. 291,872 | 9/1987 | Simons et al. | D12/96 |
| 3,711,146 | 1/1973 | Madzsar et al. | 296/15 |
| 3,945,677 | 3/1976 | Servais et al. | 296/15 |
| 4,018,472 | 4/1977 | Mason, Jr. | 296/15 |
| 4,036,519 | 7/1977 | Servais et al. | 296/15 |
| 4,343,506 | 8/1982 | Saltzman | 296/15 |
| 4,611,796 | 9/1986 | Orr | 296/15 |
| 4,750,772 | 6/1988 | Haegert | 296/180.2 |

*Primary Examiner*—Robert R. Song
*Attorney, Agent, or Firm*—F. David AuBuchon; Dennis K. Sullivan

[57] ABSTRACT

The integral cab side extender or fairing for a tractor-trailer provides reduction of aerodynamic drag. The cab extender is a unitary structure including a rear-quarter-panel-forming portion having a rear wall, a side wall and a front wall. The side wall and rear wall of the rear-quarter-panel-forming portion form an integral fairing. The side wall has a sinuous, progressively rearwardly and laterally outwardly flared sidewall-forming surface and the rear wall has a rearwardly laterally outwardly flared rear wall-forming surface which converges with the flared sidewall-forming surface to form the fairing.

The method for mounting the rear-quarter-panel-forming cab extender to a cab of a tractor includes the steps of:

sliding the rear-quarter-panel-forming cab extender over exposed frame members of the cab;

positioning a cutout provided in the front wall of the cab extender over a striker of a door latch;

aligning a flange of the rear wall of the cab extender against a rear end edge portion of a rear outer panel of the cab; and fixing the cab extender to the exposed frame members and to the rear outer panel of the cab.

11 Claims, 3 Drawing Sheets

REAR QUARTER PANEL FORMING INTEGRAL CAB EXTENDER

BACKGROUND OF THE INVENTION

1. Field of the Invention

The present invention relates to a rear-quarter-panel-forming integral cab extender for a semi tractor cab. More particularly, the present invention relates to an integral cab extender which replaces the conventional rear quarter panel of the cab and provides a rear quarter panel incorporating an integral aerodynamic side fairing for a semi tractor cab for minimizing the gap between the semi tractor cab and the trailer being pulled behind the cab.

2. Description of the Prior Art

Heretofore various aerodynamic cab extenders or fairings have been proposed Such aerodynamic cab extenders have been in the form of add-on structures which are bolted to the outer surface of a conventional rear quarter panel of a semi tractor cab along a rear end edge of the panel. The provision of such add-on fairings has created additional joints on the rear quarter panel, where the cab extender is mounted to the cab and has not provided a smooth transitional surface for the rear quarter panel.

One example of such an add-on cab extender is disclosed in the Madzsar et al. U.S. Pat. No. 3,711,146. This cab extender is formed of one or more extraneous panels which are mounted onto an existing tractor cab rear quarter panels. In the mounting of such extenders, it will be seen that a smooth transition is not provided over the surface of the rear quarter panel of the cab due to the at least one seam formed between the add-on cab extender and the rear quarter panel of the cab.

As will be described in greater detail hereinafter, the rear-quarter-panel-forming integral cab side extender of the present invention differs from commonly utilized cab extenders by providing an integral fairing which incorporates a rear quarter panel and which provides a smooth continuous transitional surface to the side wall of the cab from the rear of the door opening to the rear edge of the cab extender. Not only is the add-on, seamed look obtained with add-on fairings or extenders eliminated, but the structure of the integral cab extender forming the rear quarter panel is such as to provide for easy removal for repair or replacement of the crash-vulnerable rear quarter panel.

SUMMARY OF THE INVENTION

According to the invention, there is provided an integral cab extender or fairing for a tractor-trailer for reduction of aerodynamic drag, said extender comprising a unitary structure including a rear-quarter-panel-forming portion having a rear wall, a side wall and a front wall, the side wall and rear wall of said rear-quarter-panel-forming portion forming an integral fairing, the side wall having a sinuous, rearwardly and laterally outwardly flared sidewall-forming surface and the rear wall having a rearwardly laterally outwardly flared rear wall-forming surface which converges with said sidewall-forming surface to form the fairing.

Further according to the invention, there is provided a method for mounting the rear-quarter-panel-forming cab extender to a cab of a tractor including the steps of:

sliding the rear-quarter-panel-forming cab extender over exposed frame members of the cab;

positioning a cutout provided in a front wall of said cab extender over a striker of a door latch;

aligning a flange of said rear wall of said cab extender against a rear end edge portion of a rear outer panel of the cab; and fixing said cab extender to the exposed frame members and to the rear outer panel of the cab.

DESCRIPTION OF THE PREFERRED EMBODIMENT

Figure 1:
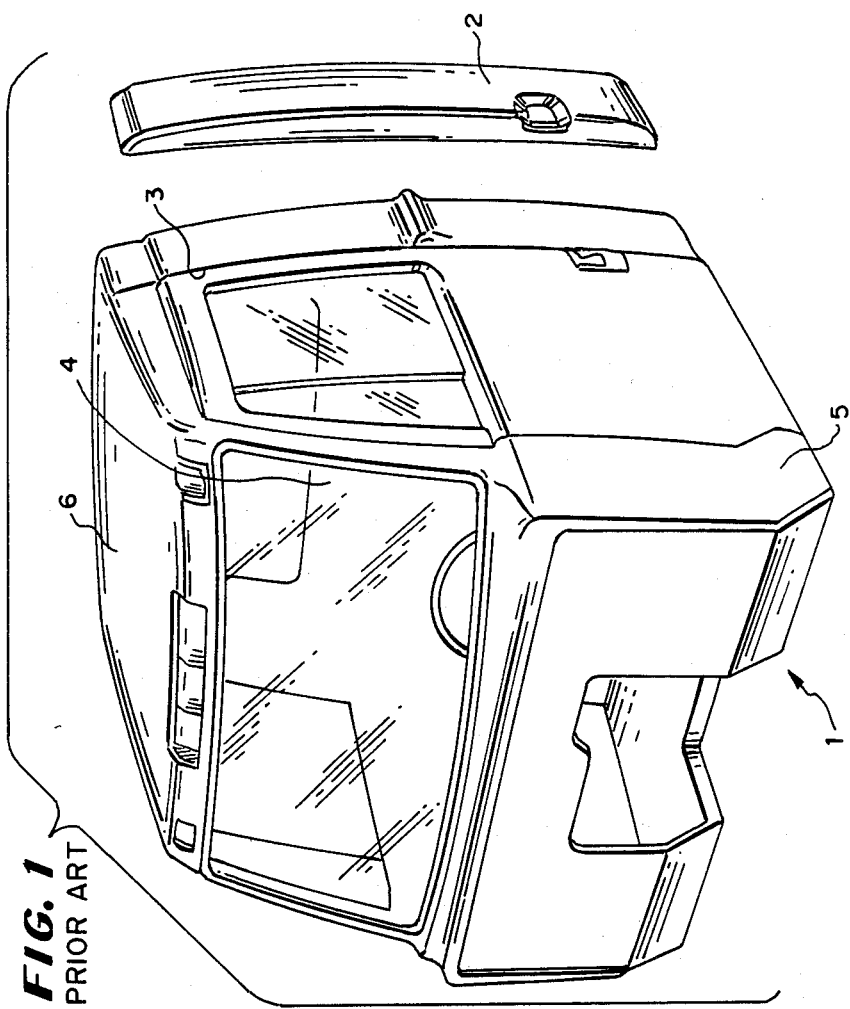
FIG. 1 is a perspective view of a prior art cab of a semi tractor incorporating a conventional, somewhat planar rear quarter panel.

In FIG. 1 there is shown a perspective view of a semi-tractor cab 1 which includes a conventional, somewhat planar rear quarter panel 2 which is to be mounted onto the frame of the cab 1 to extend rearwardly from behind a rear end edge of the door opening 3 of the cab 1 and around the back of the cab just over a lateral edge of a rear outer panel 4 of the cab 1. Such conventional rear quarter panel 2 is not useful in streamlining the tractor aerodynamically inasmuch as it does not provide means for enclosing at least some of the space between the rear wall 4 of the cab 1 and the front wall of the trailer (not shown) being pulled by the semi tractor or for extending the side wall surface 5 of the cab 1 progressively laterally outwardly and rearwardly, toward the lateral edges of the front wall of the trailer.

In this respect, especially with the introduction of trailers that are 102 inches wide, a significant portion of the front wall of the trailer will extend laterally beyond the sides of the cab 1 and will cause greater drag due to the increased front wall surface against which air can cause additional friction when the trailer is being pulled forwardly by the semi tractor.

In streamlining a tractor-trailer combination, the front wall surface of the trailer, as well as the gap between the rear wall 4 of the cab 1 and the front wall of the trailer, must be covered. Such covering is best provided by a flared cab side extender or fairing which extends the side walls 5 of the cab 1 laterally outwardly and rearwardly toward the lateral front wall edges of the trailer. Also, the roof 6 of the cab 1, if necessary, can be flared upwardly and extended rearwardly. One embodiment of such an aerodynamically modified cab is shown in FIG. 2.

Figure 2:
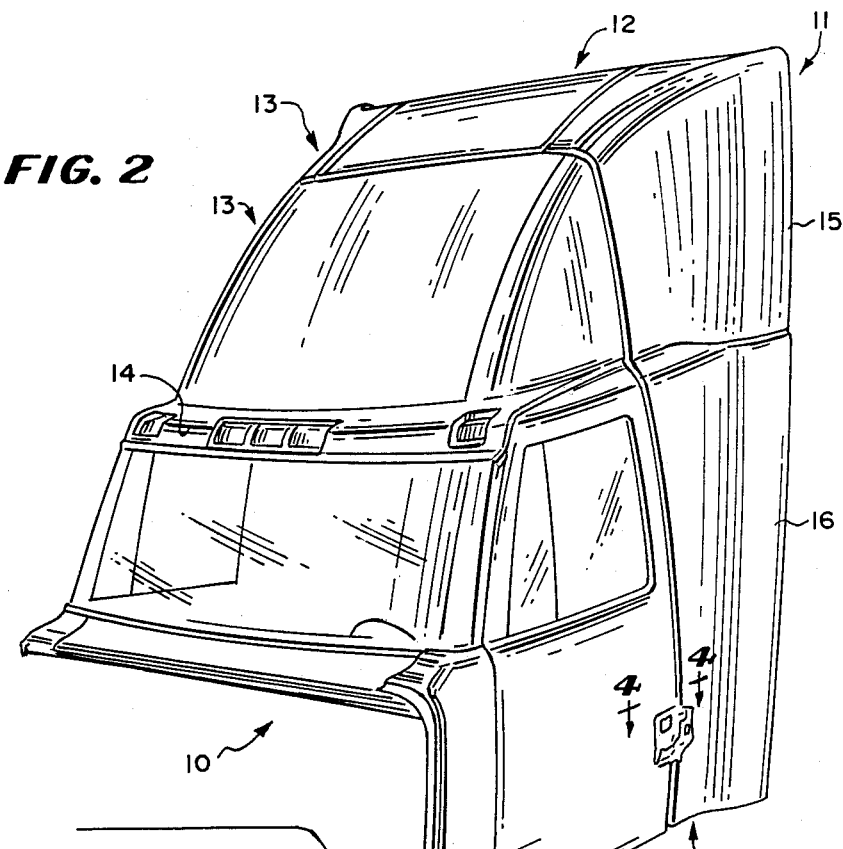
FIG. 2 is a perspective view of a cab of a semi tractor incorporating a rear quarter panel forming integral cab extender of the present invention in place of the conventional rear quarter panel of the cab.

A tractor cab 10 is shown in FIG. 2 which is fitted with an aerodynamic structure 11. The structure 11 includes a roof mounted multisectional drag reducer 12 which includes first and second plates 13 which extend upwardly from the front edge of the roof 14 of the cab 10 and two side plates 15 which form side panels 15 for the roof mounted drag reducer 12 and a rear-quarter-panel-forming integral cab side extender or fairing 16 which is constructed according to the teachings of the present invention and which is mounted at the rear corner 17 of the cab 10. It is to be understood that one cab extender 16 is mounted at each rear corner 17 of the cab 10 and that the aerodynamic structure 11 includes two mirror image cab extenders 16 which form a continuation of the roof mounted side fairings 15.

The aerodynamic structure 11 and rear-quarter-panel-forming integral cab extender 16 thereof are designed for use on cabs 10 which require aerodynamic modifications for more economical functioning, such as cabs 10 which are ahead of trailers having a front wall surface (i.e, box type or dump), against which air will impinge when the tractor-trailer combination is in motion. Such impingement of air on the front wall of the trailer causes a drag on the combination and thus a larger fuel consumption.

To aid in reducing the aerodynamic drag caused by the large sized front wall of the trailer extending above and laterally beyond the cab 10, aerodynamic extenders are necessary to provide a smooth transitional surface over a portion of the space between the cab and front wall of the trailer, wherein the dimensions of the cab 10 are slowly or progressively extended until they are equal to or slightly greater than the dimensions of the front wall of the trailer.

Figure 3:
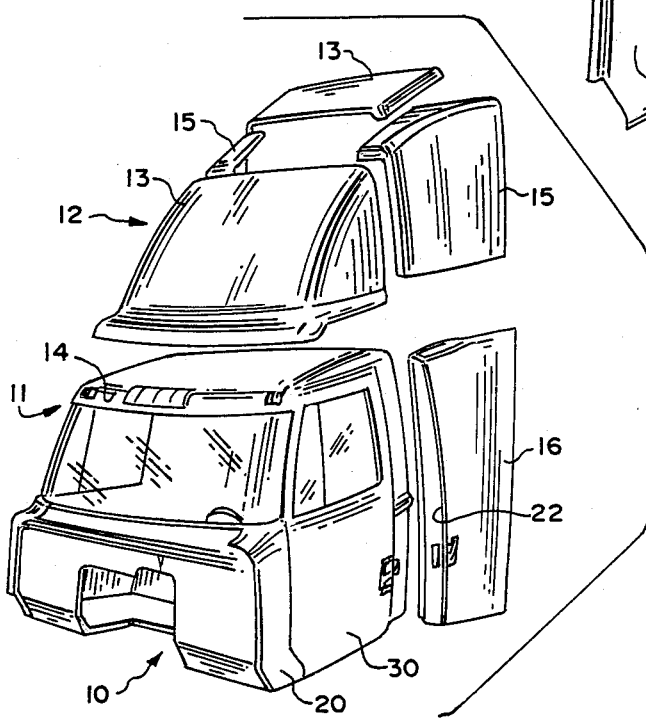
FIG. 3 is an exploded perspective view of the cab incorporating the rear-quarter-panel-forming integral cab extender shown in FIG. 2 and shows the integration of the integral cab extender into what is commonly referred to as an aerodynamic "package" for the semi tractor.

In FIG. 3, the aerodynamic structure 11 is shown exploded away from the cab 10 and shows the mating of the rear-quarter-panel-forming integral cab extender 16 of the present invention to the various other sections of the structure 11 and particularly to the side panels 15 directly thereabove.

As shown, the rear-quarter-panel-forming integral cab extender 16 of the present invention is a unitary structure which replaces the conventional planar rear quarter panels (FIG. 1) and is not an extender of add-on type. The extender 16, as shown, flares sinuously laterally outwardly away from a side surface 20 of the cab 10 as it extends rearwardly from its outer front edge 22 (FIG. 3), which is located adjacent a rear wall 23 (FIG. 4) of a door opening 24 (FIG. 4) in the cab 10.

Since the integral cab extender 16 incorporates structure forming a rear quarter panel, is of unitary construction, and is mounted in place of the conventional rear quarter panel, no external seams are created along the side surface 20 of the cab 10, as are found with add-on cab extenders. The cab extender 16 thus provides a smooth, integral outer transitional surface thereover, without obtrusive seams.

Figure 4:
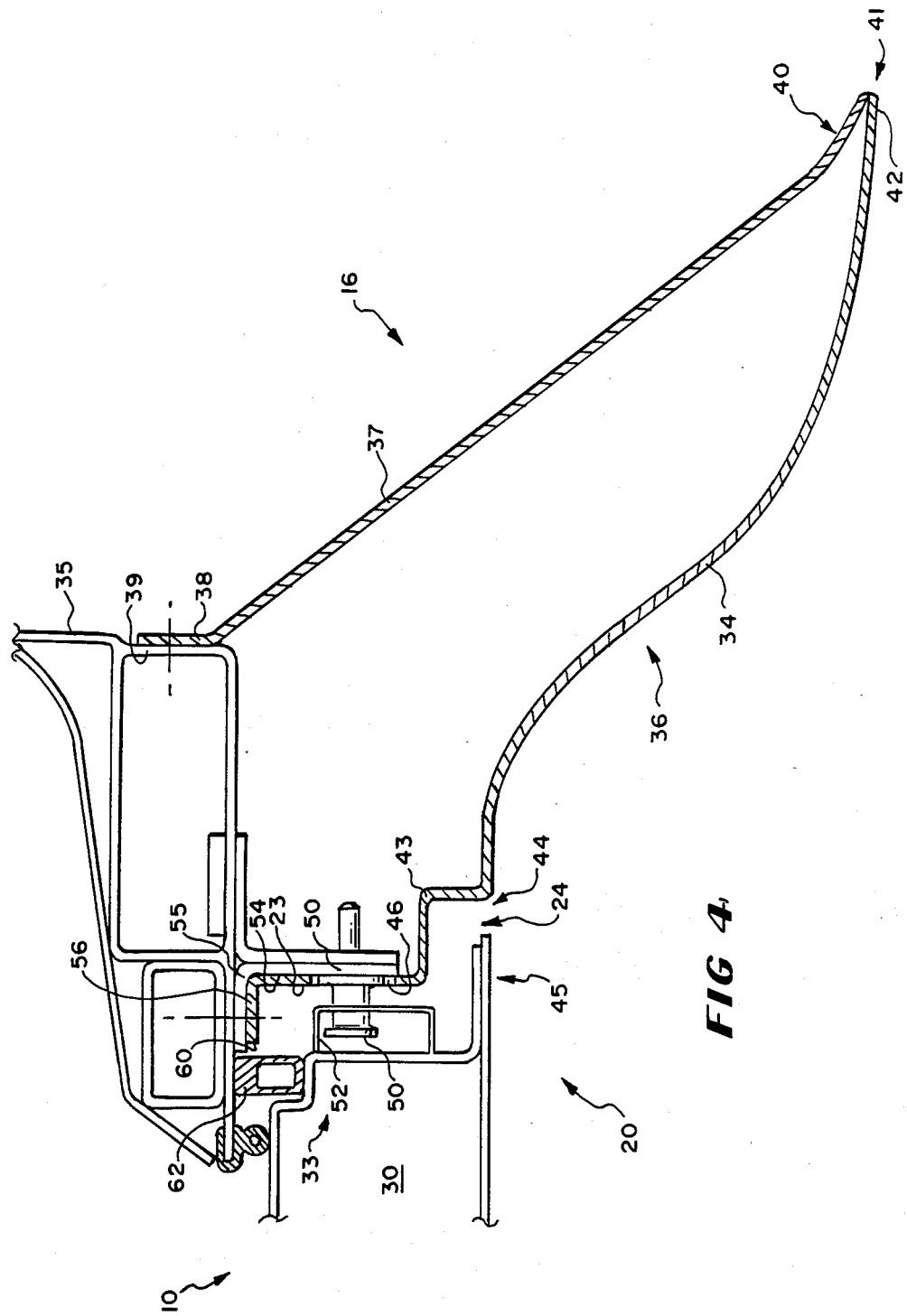
FIG. 4 is a sectional view through a portion of a side wall of a cab, shows a rear portion of a door and the rear-quarter-panel-forming integral cab extender of FIG. 2 mounted therebehind and is taken along line 4—4 of FIG. 2.

The integral cab extender 16, as will be described in connection with the description of FIG. 4, is formed in such a manner as to be a replacement part for a conventional rear quarter panel of the cab 10, provides an easily replaceable, preferably bolt-on, integral fairing structure which is used to minimize the space, and therefore the drag generated, between the cab 10 and a trailer, such as a box trailer being pulled therebehind while at the same time forming a rear quarter panel for the cab 10.

FIG. 4 shows a cross-sectional view through a rearward portion of the side wall 20 of the cab 10, showing a rear end portion of one door 30 of the cab 10 and one rear-quarter-panel-forming integral cab extender 16 of the present invention mounted therebehind. The section is taken above the level of a latch mechanism 33 for the door 30.

As shown, the rear-quarter-panel-forming integral cab extender 16 is hollow and has a sinuous, rearwardly and laterally outwardly flared side wall surface 34 which extends progressively laterally outwardly from the remainder of the side surface 20 of the cab 10 and extends rearwardly of a rear outer panel 35 of the cab 10 to a position where it will minimize the gap between the rear wall panel of the cab and the trailer (not shown). This side wall surface 34, which replaces the somewhat planar sidewall of a conventional rear quarter panel forms an integral side fairing 36 of the rear-quarter-panel-forming cab extender 16.

A rear-wall-continuation-forming portion 37 of the extender 16 is also flared rearwardly outwardly from an inwardly extending flange portion 38 which is planar and aligns against a rear end edge section 39 of the rear outer panel 35 to form a continuation of the rear outer panel 35 of the cab 10 until such point where a lateral end edge portion 40 of the rear-wall-continuation-forming portion 37 meets and forms a V shaped convergence 41 with a rear end edge 42 of the laterally outwardly flared side wall surface 34 of the extender 16.

The rear-wall-continuation-forming portion 37 of the extender 16 can be joined to the rear outer panel 35 of the cab by any suitable means. If, for instance, the aerodynamic structure 11 is to become a permanent part of the cab 10, the rear-wall-continuation-forming portion 37 may be welded or adhesively bonded onto the rear outer panel 35. On the other hand, if the cab 10 need only be aerodynamically modified during specific time periods, and one wanted to place the conventional rear quarter back into use, attachment could be made by means of bolts, so that the conventional quarter panel and cab extender 16 could be interchangeable.

A front or forwardly facing wall or surface 23 of the cab extender 16 forms the rear edge or wall 23 of the door opening 24 and has a recessed shoulder 43 formed at the outer corner 44 thereof for receiving thereover a rear lip 45 of the door 30. This configuration again provides for a smooth surface along the side wall 20 of the cab 10.

The front wall 23 of the extender 16 is also provided with a cutout 46 which fits over a striker 48 extending forwardly from a section 50 of the cab 10 which frames the rear wall 23 of the door opening 24. This striker 48 coacts with a latch 52 of the latching mechanism 33 of the door 30 for releasably securing the door 30 in a closed position. The front wall 23 of the extender 16 then continues inwardly along a forwardly facing surface 54 of the section 50 of the cab 10 and then bends sharply around an angle 55 in the section 50, to form a forwardly extending flange 56, a forward end edge 60 of which is located just behind a primary door seal 62 for the door 30.

By the provision of the extender 16 as defined above, one simply slides the rear-quarter-panel-forming integral cab extender 16 over the exposed internal members of the cab 10 and bolts the extender 16 to the members of the cab 10. By this simple method of installation, the cab 10 is provided with an aerodynamically modified rear-quarter-panel-forming cab extender 16 incorporating an integral lateral or side fairing 36 having a smooth, seam-free transitional surface 34, with replacement being simply a matter of removing and reinserting bolts.

From the foregoing description, it will be apparent that the rear-quarter-panel-forming integral cab extender 16 has a number of advantages, some of which have been described above and others of which are inherent in the invention.

Also it will be apparent from the foregoing description that various modifications can be made to the rear-quarter-panel-forming integral cab extender 16 of the present invention without departing from the teachings of the invention. Accordingly, the scope of the invention is only to be limited as necessitated by the accompanying claims.

We claim:

1. In combination with a cab of a tractor-trailer, a cab side extender for reduction of air drag, said cab extender comprising a unitary structure attached to said cab and comprising a rear-quarter-panel-forming portion including a rear wall, a side wall and a front wall, the side wall and rear wall of said rear-quarter-panel-forming portion forming an integral aerodynamic fairing, the side wall having a rearwardly and laterally outwardly flared sidewall-forming surface and the rear wall having a rearwardly laterally outwardly flared rear-wall-forming surface which extends from a vertical mounting surface engaging the cab and converges with a rear end edge of said sidewall-forming surface to form the fairing.

2. The cab extender of claim 1 wherein said fairing is approximately V shaped.

3. The cab extender of claim 1 wherein a depressed front shoulder is provided along a front end edge of said sidewall-forming surface.

4. A cab side extender for a tractor-trailer for reduction of air drag, said cab extender comprising a unitary structure comprising a rear-quarter-panel-forming portion including a rear wall, a side wall and a front wall, the side wall and rear wall of said rear-quarter-panel-forming portion forming an integral aerodynamic fairing, the side wall having a rearwardly and laterally outwardly flared sidewall-forming surface, said sidewall-forming surface having a depressed front shoulder disposed along a front end edge thereof, and the rear wall having a rearwardly laterally outwardly flared rear-wall-forming surface which converges with a rear end edge of said sidewall-forming surface to form the fairing, said front wall forming a forwardly facing door-opening-rear-wall-forming surface which extends laterally inwardly from said depressed front shoulder and has an inner forwardly extending terminal flange.

5. The cab extender of claim 4 wherein said front wall has a cutout therein through which a striker of a door latching means extends, said front wall facing a rear end surface of a door of the cab.

6. The cab extender of claim 5 wherein an outer sidewall rear end edge of the door terminates within said depressed front shoulder and wherein said outer sidewall of said door is flush with a front edge of the sidewall forming surface of said rear-quarter-panel-forming portion just behind the depressed shoulder.

7. The cab extender of claim 4 wherein said forwardly extending flange of said front wall terminates just behind a primary seal for the door which extends and is compressed between a forwardly extending flange of a door opening and an inside peripheral edge surface of said door.

8. The cab extender of claim 1 wherein two cab extenders are mounted to the cab, each cab extender being a mirror image of the other.

9. The cab extender of claim 8 wherein the distance between the V shaped convergences of the two cab extenders, measured across a back of the cab, is at least 96 inches.

10. The cab extender of claim 8 wherein the distance between the V shaped convergences of the two cab extenders, measured across a back of the cab, is at least 102 inches.

11. For use with a tractor cab structure, a cab extender assembly comprising a fairing mounted to each side of the cab structure adjacent to and extending rearwardly of a door opening of the cab structure, each fairing including a front wall section for connecting to a portion of the cab structure adjacent the door opening, an S-shaped side wall flaring laterally outwardly and rearwardly to a rear, generally vertical edge and a back wall section extending laterally inwardly and forwardly from said rear, generally vertical edge to a location spaced rearwardly of said front wall for engaging another portion of said cab structure.

* * * * *